(12) United States Patent
Satoh

(10) Patent No.: US 6,470,752 B2
(45) Date of Patent: Oct. 29, 2002

(54) ULTRASONIC DETECTION METHOD AND APPARATUS AND ULTRASONIC DIAGNOSTIC APPARATUS

(75) Inventor: Tomoo Satoh, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/911,705

(22) Filed: Jul. 25, 2001

(65) Prior Publication Data

US 2002/0017141 A1 Feb. 14, 2002

(30) Foreign Application Priority Data

Jul. 27, 2000 (JP) .......................... 2000-226990

(51) Int. Cl.⁷ .............................. G01N 9/18; A61B 8/00
(52) U.S. Cl. .............................. 73/655; 73/596; 73/643; 600/443
(58) Field of Search ..................... 73/655, 596, 605, 73/606, 609, 643, 657, 800; 600/437, 438, 443

(56) References Cited

U.S. PATENT DOCUMENTS

| | | | | |
|---|---|---|---|---|
| 4,071,753 A | * | 1/1978 | Fulenwider et al. | ......... 250/227 |
| 4,678,905 A | * | 7/1987 | Phillips | ......... 250/227 |
| 5,353,262 A | * | 10/1994 | Yakymyshyn et al. | ......... 73/632 |
| 5,373,487 A | * | 12/1994 | Crawford et al. | ............. 73/655 |
| 5,428,447 A | * | 6/1995 | Toida | ........................... 356/372 |
| 5,590,090 A | * | 12/1996 | Duggal et al. | ................. 367/7 |
| 5,621,532 A | * | 4/1997 | Ooki et al. | ................ 356/144 |
| 5,705,809 A | * | 1/1998 | Kershaw | ................ 250/227.14 |
| 5,732,046 A | * | 3/1998 | O'Donnell et al. | ......... 367/149 |

OTHER PUBLICATIONS

Ultrasonic Imaging 20, 1–15 (1998) (Progress in Two–dimensional Arrays for Real–Time Volumetric Imaging) E.D. Light, R.E. Davidsen, .O. Fiering, T.A. Hrsuchika and S.W. Smith.
Optical Transducer for reception of ultrasonic waves J. Acousi. Soc. Am. 93 (2), Feb. 1993.

* cited by examiner

Primary Examiner—Hezron Williams
Assistant Examiner—Jacques Saint-Surin
(74) Attorney, Agent, or Firm—Sughrue Mion, PLLC

(57) ABSTRACT

An ultrasonic detection method and apparatus are suited for real-time collection of three-dimensional ultrasonic data. The ultrasonic detection apparatus has an ultrasonic-optical transducer including a first optical layer and a second optical layer which define a gap having a predetermined length therebetween, the second optical layer being resiliently deformed such that the length of the gap varies when ultrasonic waves are applied from a second optical layer side; a light source for introducing a light beam having a wavelength longer than the gap length from a first optical layer side such that the light beam is totally reflected at an interface between the first optical layer and the gap; a detecting unit for two-dimensionally detecting distribution of intensity of the reflected light beam which varies depending on variation of intensity of light leaking from the first optical layer via the gap into the second optical layer; and a signal processing unit for two-dimensionally obtaining distribution of sound pressure of the ultrasonic waves applied on the second optical layer on the basis of the distribution of intensity of the reflected light beam detected by the detecting unit.

21 Claims, 15 Drawing Sheets

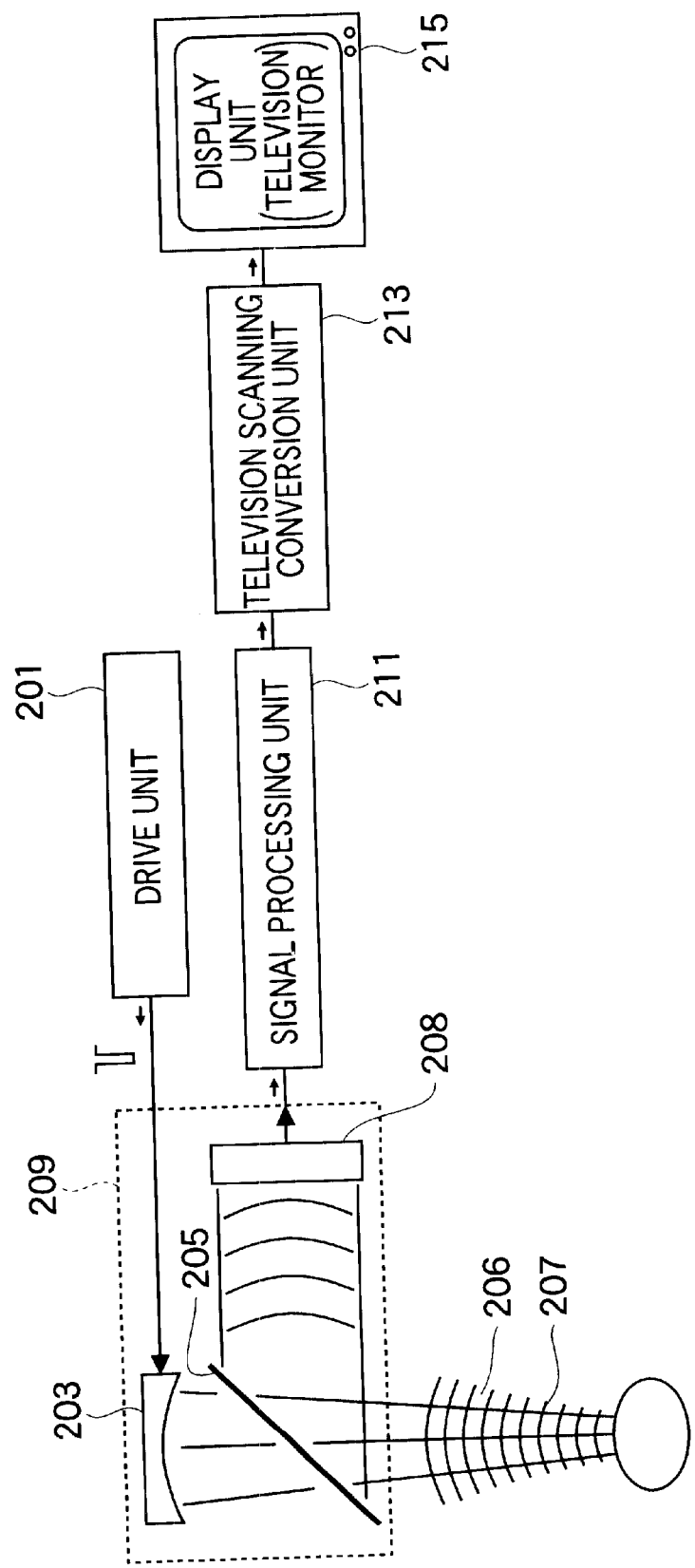

ULTRASONIC DETECTION METHOD AND APPARATUS AND ULTRASONIC DIAGNOSTIC APPARATUS

BACKGROUND OF THE INVENTION

1. Field of the Invention

The present invention relates to a method and apparatus for detecting the dynamic variation of, e.g., ultrasonic waves propagating through an object to be inspected. Further, the present invention relates to an ultrasonic diagnostic apparatus provided with such an ultrasonic detection apparatus.

2. Description of a Related Art

A typical ultrasonic diagnostic apparatus performing the so-called ultrasonic echo observation, etc., uses an ultrasonic sensor unit (probe) made of a piezoelectric material represented by PZT (Pb (lead) zirconate titanate).

FIGS. 18A and 18B diagrammatically show the structure of the conventional probe. FIG. 18A is a general perspective view of the probe and FIG. 18B is an enlarged perspective view of an array vibrator included in the probe.

Referring to FIG. 18A, a probe 301 is generally thin box-shaped and has a rectangular probe face 302. The probe face 302 is abutted against the human body to transmit ultrasonic waves and receive ultrasonic echoes returned from a far site within the human body. A cable 307 is connected to the top of the probe 301, for sending ultrasonic transmission and reception signals therethrough.

A comb-shaped array vibrator 303 is present in the probe face 302. The array vibrator 303 serves both as an ultrasonic oscillator and an ultrasonic receiver. Referring to FIG. 18B, the array vibrator 303 includes a multiplicity of (e.g., 256) comb-tooth-shaped discrete vibrators 305 (e.g., 0.2 mm wide, 20 mm long) arrayed in a thin (e.g., 0.2 mm to 0.3 mm thick) PZT strip with a multiplicity of slits 306 (e.g., 0.1 mm wide).

Each discrete vibrator 305 is formed with an electrode having a signal line connected thereto. The array vibrator 303 has a front surface (lower side in the diagram), to which are adhered an acoustic lens layer and a matching layer which are made of a resin material including rubber, and has a reverse surface to which is adhered a packing material. The acoustic lens layer contributes to an improvement in the transmitted ultrasonic wave focusing properties. The matching layer serves to enhance the ultrasonic wave transmission efficiency. The packing material has a function to retain the vibrator and puts earlier termination to the vibration of the vibrator.

It is to be noted that such ultrasonic probe and ultrasonic diagnostic apparatus are described in larger detail in "Ultrasonic Observation Method and Diagnostic Method" published by Toyo Publisher and "Fundamental Ultrasonic Medicine" published by Ishiyaku Publisher.

By the way, in the field of the ultrasonic diagnosis, three-dimensional data collection is desired to obtain more detailed biological information. In order to realize this, it is required to provide ultrasonic detectors (ultrasonic sensors) in the form of a two-dimensional array. However, the above-mentioned PZT makes difficult further miniaturization and device integration exceeding the present state due to the following reasons. That is, the PZT material (ceramics) processing technology is coming nearer to its limitation, such that further miniaturization may result in an extreme reduction of the processing yield. The number of wires may also increase, which leads to increase electrical impedance of the wiring. The crosstalk may also increase between the devices (discrete vibrators). For these reasons, it is considered to be difficult in the state of the art to realize the two-dimensional array probe using PZT.

ULTRASONIC IMAGING 20, 1–15 (1998) carries a thesis titled "Progress in Two-Dimensional Arrays for Real-Time Volumetric Imaging" by E. D. Light, et. al. of University of Duke. This document discloses a probe having a two-dimensional array for the PZT ultrasonic sensor. At the same time, however, this reads as follows. "To obtain images of a similar quality, the number of elements of the two-dimensional array needs to be 128×128=16,384. However, formation of such a multiplicity of RF channels may be infeasible in near future due to its complexity and increased costs. It may also be extremely difficult to densely connect such a multiplicity of elements to one another" (page 2, lines 14–18).

On the other hand, sensors utilizing optical fibers are also available as the ultrasonic sensors not using the piezoelectric material such as PZT. Such optical fiber ultrasonic sensors are suitable for the measurement at places greatly influenced by magnetic field or at minute sites.

J. Acoust. Soc. Am. 93(2), February 1993, pp. 1182–1191 bears a thesis titled "Optical transducer for reception of ultrasonic waves" by Partick J. Phillips, et. al. This document proposes an ultrasonic-optical transducer utilizing the fact that the intensity of near-field light (evanescent light) in the vicinity of the interface where light is totally reflected varies because of the presence of an object in the near-field. The document also discloses determining the one-dimensional distribution of sound pressure of the ultrasonic waves by scanning the light beam spot over the total reflection interface.

However, the thesis by Phillips, et. al. does not include any specific disclosure on the method of executing the detection of the two-dimensional distribution of ultrasonic wave sound pressure, without making beam scanning, in real time which is required for the medical image diagnostic apparatus.

SUMMARY OF THE INVENTION

The present invention was conceived in view of the above deficiencies. It is therefore the object of the present invention to provide an ultrasonic detection method, an ultrasonic detection apparatus and an ultrasonic diagnostic apparatus which are suited for real-time collection of three-dimensional ultrasonic data.

In order to solve the above problems, according to the present invention there is provided an ultrasonic detection method comprising the steps of: (a) introducing a light beam into an ultrasonic-optical transducer including a first optical layer and a second optical layer which define a gap having a predetermined length therebetween from a side of the first optical layer such that the light beam is totally reflected at an interface between the first optical layer and the gap to obtain the reflected light beam, the introduced light beam having a wavelength larger than the predetermined length of the gap; (b) applying ultrasonic waves onto the ultrasonic-optical transducer from a side of the second optical layer such that the second optical layer resiliently deforms to thereby vary intensity of light leaking from the first optical layer via the gap into the second optical layer;

(c) two-dimensionally detecting distribution of intensity of the reflected light beam which varies depending on variation of the intensity of the light leaking from the first optical layer via the gap into the second optical layer; and (d)

two-dimensionally obtaining distribution of sound pressure of the ultrasonic waves applied on the second optical layer on the basis of the distribution of intensity of the reflected light beam detected at step (c).

According to the present invention there is provided an ultrasonic detection apparatus comprising: an ultrasonic-optical transducer including a first optical layer and a second optical layer which define a gap having a predetermined length therebetween, the second optical layer being resiliently deformed such that the length of the gap varies when ultrasonic waves are applied from a side of the second optical layer; means for introducing a light beam having a wavelength larger than the predetermined length of the gap into the ultrasonic-optical transducer from a side of the first optical layer such that the light beam is totally reflected at an interface between the first optical layer and the gap; detecting means for two-dimensionally detecting distribution of intensity of the reflected light beam which varies depending on variation of intensity of light leaking from the first optical layer via the gap into the second optical layer; and signal processing means for two-dimensionally obtaining distribution of sound pressure of the ultrasonic waves applied on the second optical layer on the basis of the distribution of intensity of the reflected light beam detected by the detecting means.

According to the present invention there is provided an ultrasonic diagnostic apparatus comprising: a transmission unit for transmitting ultrasonic waves to an object; a detection unit having: an ultrasonic-optical transducer including a first optical layer and a second optical layer which define a gap having a predetermined length therebetween, the second optical layer being resiliently deformed such that the length of the gap varies when ultrasonic waves are applied from a side of the second optical layer; means for introducing a light beam having a wavelength larger than the predetermined length of the gap into the ultrasonic-optical transducer from a side of the first optical layer such that the light beam is totally reflected at an interface between the first optical layer and the gap; and detecting means for two-dimensionally detecting distribution of intensity of the reflected light beam which varies depending on variation of intensity of light leaking from the first optical layer via the gap into the second optical layer; a signal processing unit for two-dimensionally obtaining distribution of sound pressure of the ultrasonic waves applied on the second optical layer on the basis of the distribution of intensity of the reflected light beam detected by the detecting means; and a display unit for displaying an image on the basis of a detection signal output from the signal processing unit.

BRIEF DESCRIPTION OF THE DRAWINGS

The above and other objects, aspects, features and advantages of the present invention will become more apparent from the following detailed description when taken in conjunction with the accompanying drawings, in which:

FIG. 17 is a block diagram showing the general configuration of an ultrasonic diagnostic apparatus according to an embodiment of the present invention.

DESCRIPTION OF THE PREFERRED EMBODIMENTS

Figure 1:
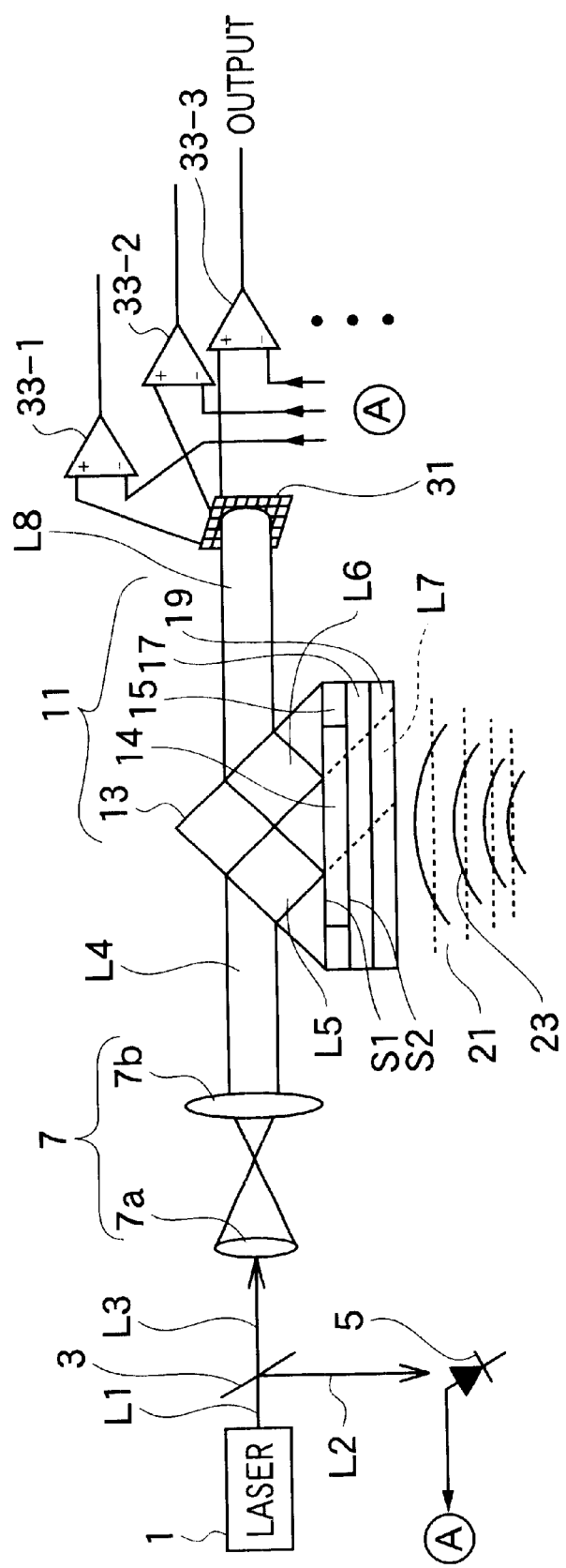
FIG. 1 is a diagrammatic view showing the configuration of an ultrasonic detection apparatus according to a first embodiment of the present invention.

The present invention will now be described with reference to the accompanying drawings which illustrate presently preferred embodiments thereof in a non-limitative manner. Throughout several views of the drawings, like constituent elements are designated by the same reference numerals and will not again be described.

FIG. 1 diagrammatically depicts the configuration of an ultrasonic detection apparatus according to a first embodiment of the present invention.

A laser 1 is visible at the left-hand end in FIG. 1. The laser 1 is a HeNe laser (wavelength: 632.8 nm) for example. The laser 1 emits a laser light beam L1 rightward in FIG. 1. On the output side of the laser 1 is a semi-transparent mirror 3 serving as a beam splitter which is disposed diagonally relative to an optical path of the laser light beam L1. The laser light beam L1 impinges on the semi-transparent mirror 3 and splits into light L3 which passes through the semi-transparent mirror 3 and light L2 which is reflected by the mirror 3 to travel downward in FIG. 1. The reflected light L2 enters a PD (photodiode) 5. An intensity signal of the light L2 detected by a PD 5 is fed to an inversion input of a differential amplifier 33.

The light L3 passing through the mirror 3 strikes on a beam expander 7 which includes two lenses 7a and 7b. The beam expander 7 expands a laser light beam having a beam diameter of 3 mm to a laser light beam having a beam diameter of about 30 mm for example. The laser light beam having the expanded beam diameter is referred to as a laser light beam L4. The laser light beam L4 impinges on a left-hand inclined surface of a triangular prism 13.

An ultrasonic-optical transducer 11 in this embodiment comprises the triangular prism 13, spacers 15, an optical flat 17 and an acoustic matching layer 19. The triangular prism 13 has a bottom surface in the shape of an isosceles triangle and is made of an optical glass for example. Referring to FIG. 1, the underside of the triangular prism 13 (hereinafter referred to as "the main surface of the triangular prism" or "first optical interface") confronts the optical flat 17. In the triangular prism 13, the laser light beam L4 to be used to detect ultrasonic waves falls on the left-hand inclined surface to be refracted thereat (L5) and is totally reflected from the main surface S1 of the triangular prism (L6). The laser light beam L6 is then refracted at the right-hand inclined surface to leave the triangular prism (L8). An optical glass layer defining the main surface S1 of the triangular prism 13 provides a first optical layer. The main surface S1 of the triangular prism 13 is a surface having an extremely high flatness of $\lambda/10$ or less in surface roughness.

The spacers 15 are arranged at opposite edges of the main surface S1 of the triangular prism 13. The spacers 15 are formed by vapor depositing aluminum (Al) to a thickness of 30 nm for example. The spacers 15 determine a length of a gap 14 defined between the triangular prism 13 and the optical flat 17. The gap 14 is filled with air for example.

The optical flat (second optical layer) 17 is disposed under the gap 14 and the spacers 15. The optical flat is a flat plate made of an optical glass for example. A surface S2 of the optical flat 17 (topside in FIG. 1) facing the triangular prism is a surface having as extremely high a flatness as $\lambda/10$ in surface roughness, similar to the main surface S1 of the triangular prism. The thickness (e.g., 1 mm) of the optical flat 17 is also extremely even.

The acoustic matching layer 19 is formed on a surface opposite to the prism of the optical flat 17. The acoustic matching layer 19 is made of a resin material for example and has a thickness of 0.1 mm to 0.2 mm.

A surface of the acoustic matching layer 19 (underside in FIG. 1) opposite to the optical flat 17 is in contact with an object to be inspected (e.g., a surface of the human body) 21. Ultrasonic waves 23 propagating through the object 21 are applied via the acoustic layer 19 to the optical flat 17.

Figure 2:
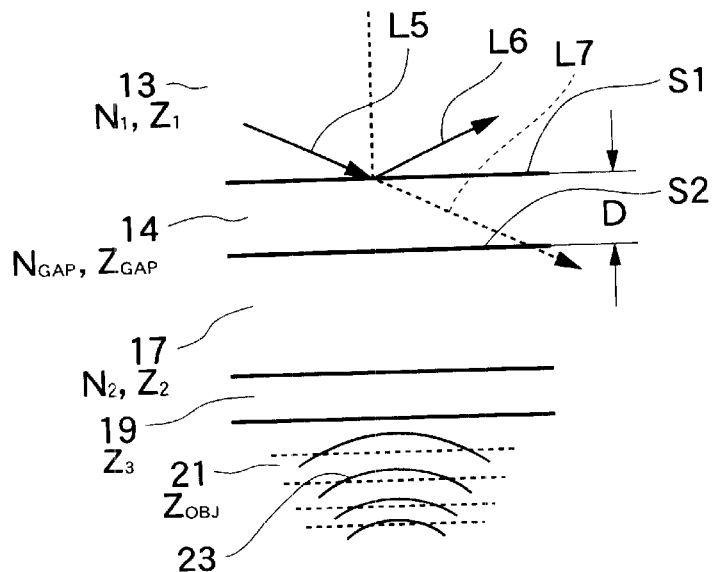
FIG. 2 is a diagrammatic view showing a part of an ultrasonic-optical transducer included in the ultrasonic detection apparatus of FIG. 1.

FIG. 2 diagrammatically depicts the major part of the ultrasonic-optical transducer included in such an ultrasonic detection apparatus as shown in FIG. 1. From top to bottom in FIG. 2 are shown the triangular prism (first optical layer) 13, the gap 14, the optical flat (second optical layer) 17, the acoustic matching layer 19 and the object 21 in the mentioned order.

Light L5 strikes on the first optical interface S1 of the transducer at an angle not less than the critical angle between the first optical layer 13 and the gap 14, and then is totally interface S1, however, there occurs an evanescent field to allow a leak of a near-field light (evanescent light) L7. When coming away slightly from the interface S1, the near-field light L7 remarkably attenuates. In case a length D of the gap 14 is smaller than the wavelength $\lambda$ of the light, however, the near-field light L7 having a considerable intensity can leak into the optical flat 17. For example, with the wavelength of 632.8 nm and the length of the gap 14 of the order of 5% of $\lambda$, input of the light L5 at $\theta=70$ degrees allows the leaking near-field light L7 to have the intensity of the order of 80% of the light L5. The intensity of the reflected light L6 becomes smaller by the intensity of the leak light L7 than the intensity of the input light L5. Thus, by detecting the intensity of L5 and L6 to find the difference therebetween, the intensity of the near-field light L7 can be measured.

The ultrasonic waves 23 travelling through the object 21 are applied via the acoustic layer 19 to the optical flat 17. It is preferable that the acoustic impedance $Z_3$ of the matching layer 19 be larger than the acoustic impedance $Z_{OBJ}$ of the object 21 but smaller than the acoustic impedance $Z_2$ of the second optical layer and that, if it is implemented in one layer, the following expression be satisfied:

$$Z_3 = \sqrt{Z_{OBJ} Z_2}$$

Provision of the matching layer 19 satisfying such a relation facilitates entrance of the ultrasonic waves 23 into the optical flat 17. The optical flat 17 receives an ultrasonic sound pressure from the applied ultrasonic waves to oscillate. In response to this oscillation, the surface S2 (topside in FIG. 2) of the optical flat 17 facing the triangular prism 13 is displaced such that the length D of the gap 14 dynamically varies from place to place.

The intensity of the near-field light L7 varies depending on the length D of the gap 14. Accordingly, if a two-dimensional distribution of intensity of the near-field light L7 is measured over a certain range at the interface S1, then it is possible to detect the distribution of sound pressure of the ultrasonic waves 23 propagating through the interior of the object 21.

Optical characteristics of each optical layer will hereinafter be described by way of example.

First optical layer 13: optical glass (BK7), refractive index $N_1$=approx. 1.5, acoustic impedance $Z_1=15.44\times10^6$ kg·m$^{-2}$·s$^{-1}$ Gap 14: air, refractive index $N_{GAP}=1.0$, acoustic impedance $Z_{GAP}=415$ kg·m$^{-2}$·s$^{-1}$ Second optical layer 17: optical glass (BK7), refractive index $N_2$=approx. 1.5, acoustic impedance $Z_2=15.44\times10^6$ kg·m$^{-2}$·s$^{-1}$ Acoustic matching layer 19: resin, acoustic impedance (in one layer) $Z_3$=approx. $4.74\times10^6$ kg·m$^{-2}$·s$^{-1}$ Object 21: human body, acoustic impedance $Z_{OBJ}$= approx. $15\times10^6$ kg·m$^{-2}$·s$^{-1}$ The following are characteristics required or desired for the ultrasonic transducer utilizing the near-field light.

① $N_1 > N_{GAP}$; It is desirable that a larger difference lie therebetween.

This is a condition for causing a total reflection from the interface S1 between the first optical layer 13 and the gap 14. The reason for desirableness of a larger difference is that the evanescent light rapidly varies in the vicinity of the interface.

② $N_1 \approx N_2$

This is a condition for permitting the near-field light L7 occurring at the gap 14 under the first optical interface S1 to leak into the second optical layer 17. When the length of the gap is null, the light is totally transmitted through from the first optical layer to the second optical layer.

③ $Z_2 \gg Z_{GAP}$

This is a condition for allowing the length D of the gap 14 to easily vary depending on the oscillation of the second optical layer 17.

④ $Z_3 \approx \sqrt{Z_{OBJ} \cdot Z_2}$

This is a condition for securing an easy entrance of the ultrasonic waves from the object without any reflection on the acoustic matching layer and the optical flat.

Figure 3:
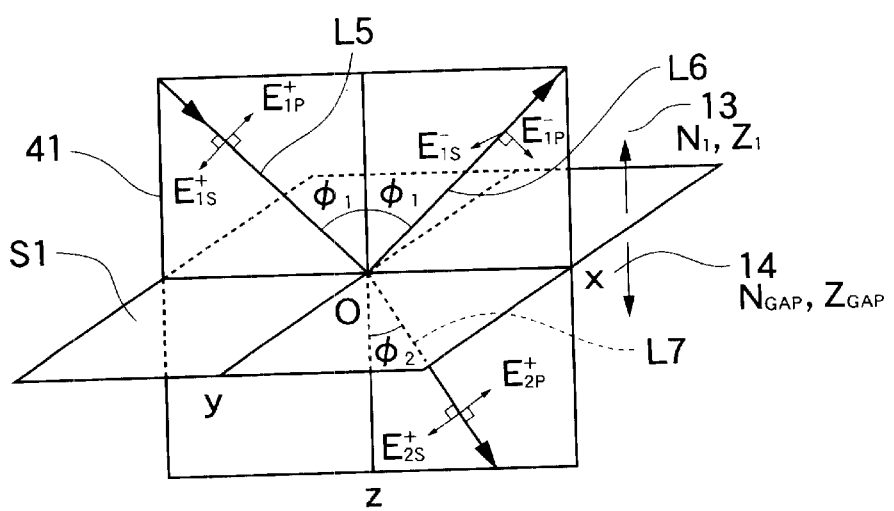
FIG. 3 is a diagrammatic view showing-a plane of polarization of an incident light beam at a first optical interface of the ultrasonic-optical transducer included in the ultrasonic detection apparatus of FIG. 1.

FIG. 3 diagrammatically depicts a plane of polarization of the incident light at the first optical interface included in the transducer of the ultrasonic detection apparatus shown in FIG. 1.

Referring to FIG. 3 there are visible the first optical layer 13, the first optical interface S1 and the gap 14. The incident light L5 impinges on the first optical interface S1 and reflects therefrom (reflected light L6). The near-field light L7 leaks from the first optical interface S1 into the gap 14. In order to better achieve the object of the present invention, it is preferred that the incident light L5 be a P-polarized wave which has a plane of polarization where the direction of optical oscillation is coincident with the direction of variation of the gap length and which is larger than an S-polarized wave in optical intensity variation attributable to the variation of the gap length.

For this reason, it is preferable that the plane of polarization of the light to be used to detect ultrasonic waves is adjusted to be parallel with a plane of incidence (P-polarized wave) by using a linearly polarized light laser as a light source or by controlling the plane of polarization of a laser light beam such as a circularly polarized light other than the linearly polarized light by using a polarizer.

Referring again to FIG. 1, the light L8 exiting the triangular prism 13 travels rightward in the diagram to enter a PD array 31. The PD array 31 includes a multiplicity of small-sized PDs which are arranged in matrix. The PD array 31 measures the distribution of intensity of the light L8.

An electric signal indicative of the intensity detected by each PD is fed to the differential amplifier 33 corresponding thereto. The differential amplifier 33 serves to cancel a variation such as drift of the light source and is provided for each of the PDs. From the PD 5 detecting the reflected light L2 from the semitransparent mirror 3 positioned on the side of the output of the laser 1 as well, each differential amplifier 33 receives an electric signal indicative of the intensity of the light L3 which is incident on the transducer 11. On the basis of the variation of the light source (laser 1) detected by the PD 5, each differential amplifier 33 obtains a difference between the above incident intensity and the variation value of the laser 1. An output signal from each differential amplifier 33 corresponds to the intensity of the near-field light, in other words, it corresponds to the length of the gap between the triangular prism 13 and the optical flat 17. Thus, by processing this signal in an appropriate manner, it is possible to detect the distribution of sound pressure of the ultrasonic waves applied on the optical flat 17.

An ultrasonic detection apparatus according to a second embodiment of the present invention will then be described with reference to FIGS. 4 and 5.

Figure 4:
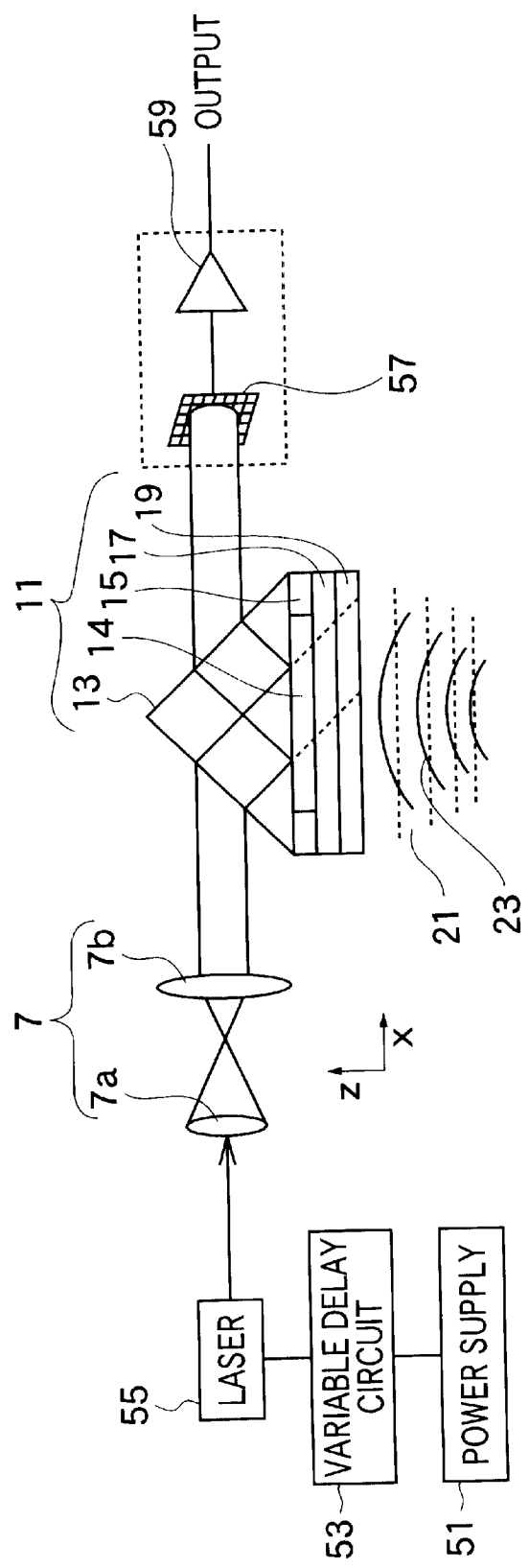
FIG. 4 is a diagrammatic view showing the configuration of an ultrasonic detection apparatus according to a second embodiment of the present invention.

FIG. 4 is a system view diagrammatically showing the configuration of the ultrasonic detection apparatus according to the second embodiment. This ultrasonic detection apparatus differs from the ultrasonic detection apparatus of FIG. 1 in that:

(1) the light source is a pulse laser 55, with a variable delay circuit 53 interposed between a power source 51 and a laser 55; and (2) a CCD imaging device (camera) 57 is provided as an area sensor for optical detection, the camera 57 reading intensity information accepted by each pixel in a time-sharing manner and issuing an electric signal to a differential amplifier 59.

Description will herein be made of operation of this ultrasonic detection apparatus. FIG. 5 is a timing chart representing the timing of operation of the ultrasonic detection apparatus of FIG. 4.

Figure 5:
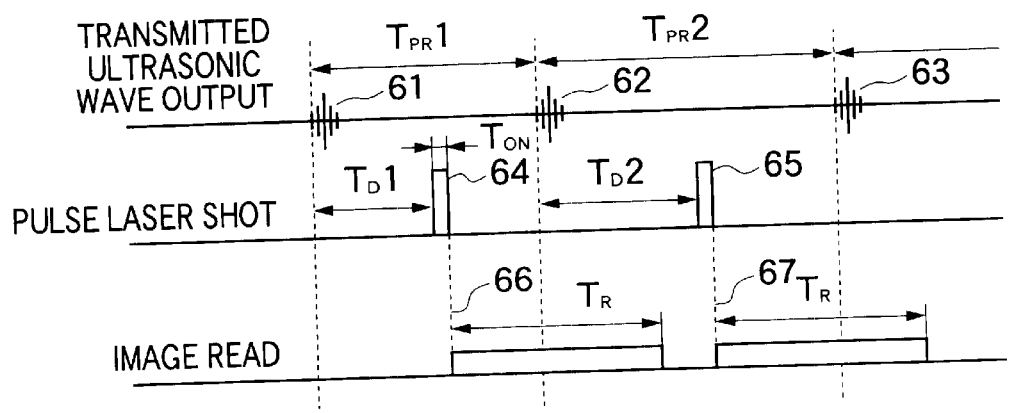
FIG. 5 is a timing chart representing the timing of operation of the ultrasonic detection apparatus of FIG. 4.

The topmost rank of FIG. 5 shows the timing of output of the ultrasonic waves to be transmitted. In this example, ultrasonic wave transmission is carried out three times as indicated by reference numerals 61, 62 and 63. A period between the first ultrasonic wave transmission and the second ultrasonic wave transmission is indicated by $T_{PR}1$, and a period between the second ultrasonic wave transmission and the third ultrasonic wave transmission is indicated by $T_{PR}2$. The reason for $T_{PR}1 < T_{PR}2$ is that the first is deeper than the second in depth of the imaged site and requires, as a function of the depth, a longer time ($T_D1 < T_D2$) to obtain an echo after transmission of the ultrasonic waves.

The second rank of FIG. 5 shows the timing of shot of the pulse laser. A brief shot 64 is performed with delay of a delay time $T_D1$ after the first ultrasonic wave transmission 61. In the second period, a brief shot 65 is effected with delay of delay time $T_D2$ after the second ultrasonic wave transmission 62. The reason for $T_D1 < T_D2$ is that the second detection is made of the ultrasonic wave reflection echo from a deeper site of the object than the first. The first shot 64 aims at a section at the depth of 80 mm from the surface of the body, and the second shot 65 aims at a section deeper by 1 mm than the section for the first shot 64 (at the depth of 81 mm from the surface of the body). Let the slice thickness in the direction where the ultrasonic waves propagate be 0.5 mm and the ultrasonic wave propagation speed within the body be 1600 m/sec, then $T_D1$, $T_D2$ and shot time $T_{ON}$ are give as follows:

$$T_D1 = (2 \times 0.08)/1600 = 100 \ \mu s$$

$$T_D2 - T_D1 = (2 \times 0.001)/1600 = 1.25 \ \mu s$$

$$T_{ON} = (2 \times 0.5 \times 10^{-3})/1600 = 625 \ ns$$

The third rank of FIG. 5 shows the timing of image read by the CCD. The image is read after the elapse of read time $T_R$ from the laser shot 64 and 65.

In this manner, the laser is pulse driven such that limitation is imposed on the time zone during which the totally reflected light depending on the ultrasonic wave intensity strikes on the area sensor, whereby it is possible to optically detect the ultrasonic wave reflected from a specific depth of the object. In this case, the shot of the source of incident light on the ultrasonic transducer is delayed from the transmission of the ultrasonic waves for the duration suitable for the collection of information on any depths within the object.

Figure 6:
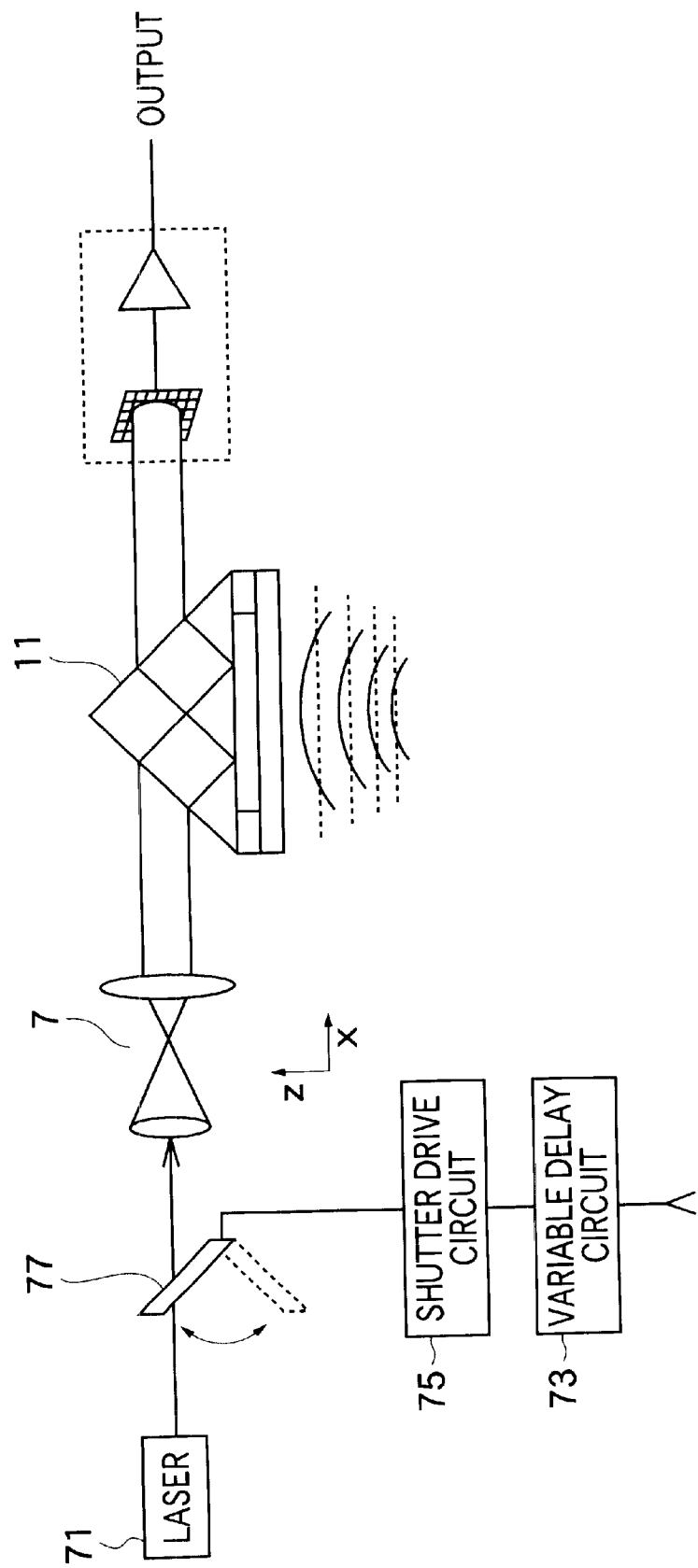
FIG. 6 is a diagrammatic view showing the general configuration of an ultrasonic detection apparatus according to a third embodiment of the present invention.

Description will then be made of an ultrasonic detection apparatus according to a third embodiment of the present invention. FIG. 6 is a system view diagrammatically showing the general configuration of the ultrasonic detection apparatus according to the third embodiment of the present invention. This ultrasonic detection apparatus provides the area sensor with a shutter to thereby impose limitation on the time zone during which the totally reflected light depending on the ultrasonic wave intensity impinges on the area sensor.

Referring to FIG. 6, a laser 71 oscillates in a successive fashion. A shutter 77 is interposed between the laser 71 and the beam expander 7 to provide, from the exterior of the light source (laser 71), an on-off control of the incident light. The shutter 77 is actuated by a variable delay circuit 73 and a shutter drive circuit 75. Such a method of regulating the timing by using the shutter may involve a defect of difficulty in increasing the operation speed due to mechanical on-off operation of the incident light but can have an advantage of capability to reduce the cost due to nonuse of the expensive pulse laser.

Figure 7:
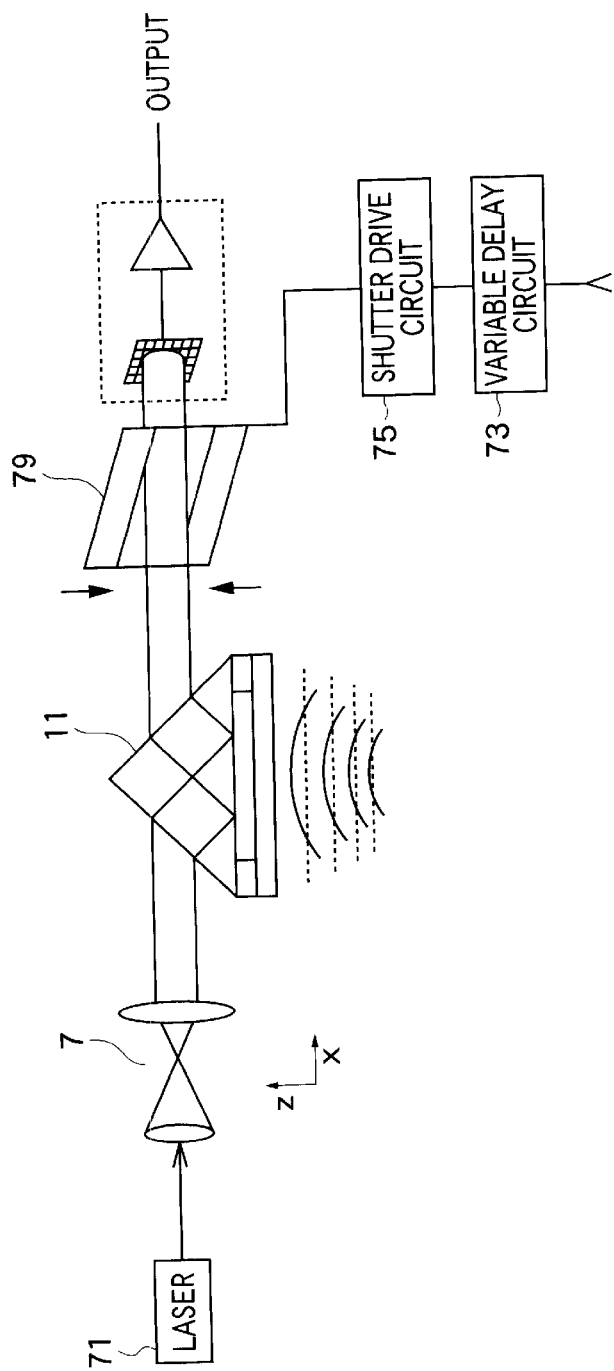
FIG. 7 is a diagrammatic view showing the general configuration of an ultrasonic detection apparatus according to a fourth embodiment of the present invention.

Description will then be made of an ultrasonic detection apparatus according to a fourth embodiment of the present invention. FIG. 7 is a system view diagrammatically showing the general configuration of the ultrasonic detection apparatus according to the fourth embodiment of the present invention.

Referring to FIG. 7, this ultrasonic detection apparatus comprises a shutter 79 intervening between the ultrasonic-optical transducer 11 and the CCD imaging device 57. The shutter 79 provides a control of the timing of the incident light onto the CCD 57. The shutter 79 is actuated by the variable delay circuit 73 and the shutter drive circuit 75. The shutter 79 may be an external mechanical shutter or an electronic shutter incorporating the CCD imaging device. Such a disposition of the shutter on the light receiving side may involve a defect that it is difficult to increase the operation speed in the case of the mechanical shutter, but can have an advantage that it is possible to reduce the cost due to nonuse of the expensive pulse laser.

Figure 8:
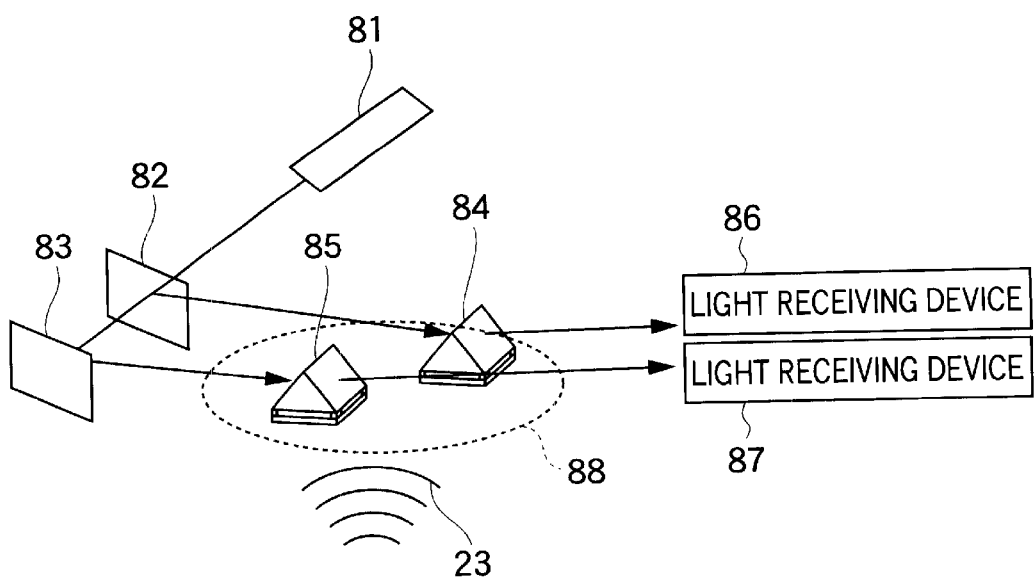
FIG. 8 is a diagrammatic view showing the general configuration of an ultrasonic detection apparatus according to a fifth embodiment of the present invention.

Description will then be made of an ultrasonic detection apparatus according to a fifth embodiment of the present invention. FIG. 8 is a system view diagrammatically showing the general configuration of the ultrasonic detection apparatus according to the fifth embodiment of the present invention.

This ultrasonic detection apparatus uses a plurality of ultrasonic-optical transducers 84 and 85 to measure the distribution of sound pressure at respective sites in an ultrasonic wave detection region 88. The transducers 84 and 85 receive light via a plurality of mirrors 82 and 83 from a single laser 81. Output light from the plurality of transducers 84 and 85 are fed to a plurality of light receiving devices 86 and 87, respectively.

According to this embodiment there is no need to receive the output light from the transducer in a further split manner as in the PD array shown in FIG. 1 for example, whereupon it is possible for each light receiving device to secure sufficient intensity, contributing to an improvement in SN ratio. The length of the gap can also readily be adjusted more evenly than the plane one-shot exposure type (using a single optical flat over the entire ultrasonic wave detection region) as shown in FIG. 1 for example, whereupon the dispersion in sensitivity between the plurality of light receiving devices can advantageously be reduced.

Figure 9:
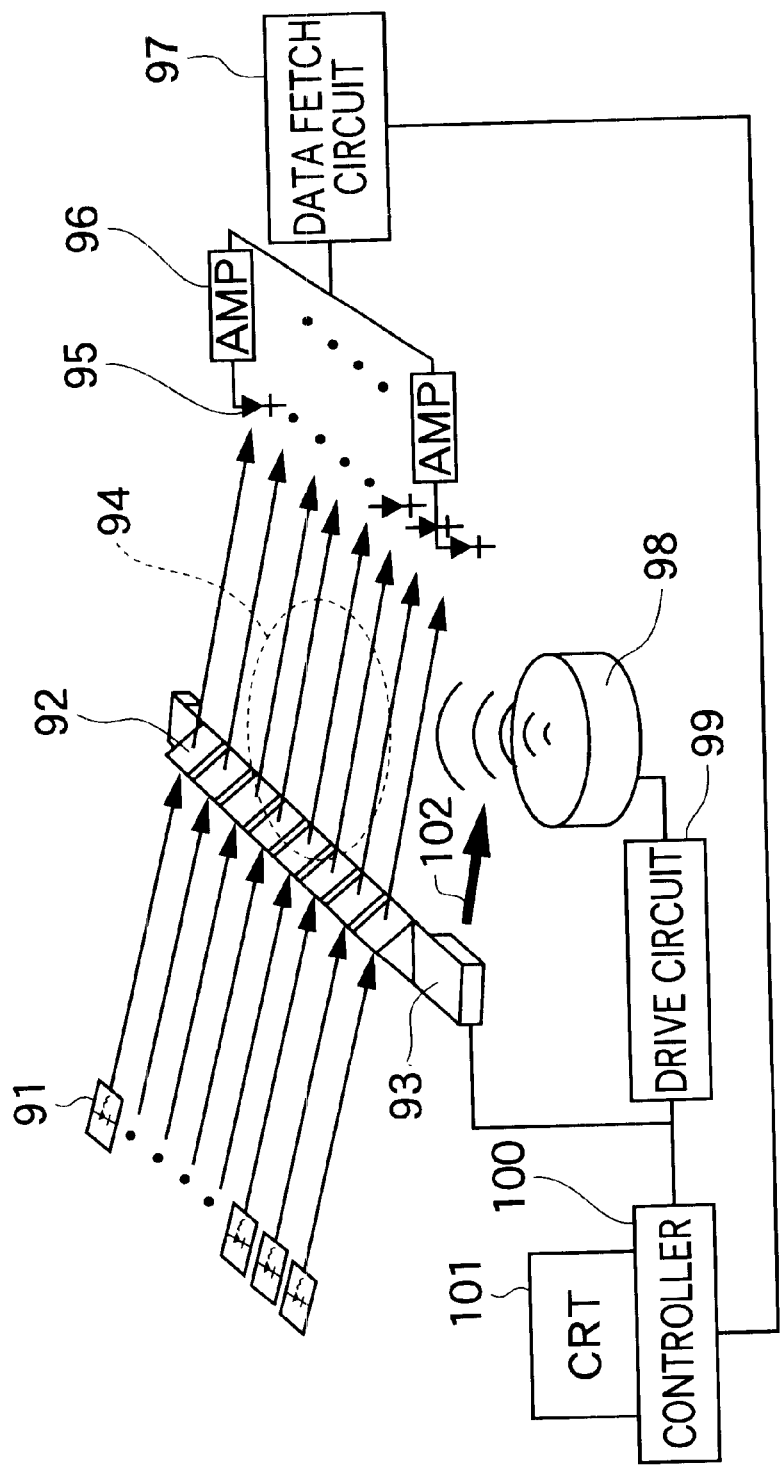
FIG. 9 is a diagrammatic view showing the general configuration of an ultrasonic detection apparatus according to a sixth embodiment of the present invention.
Figure 10:
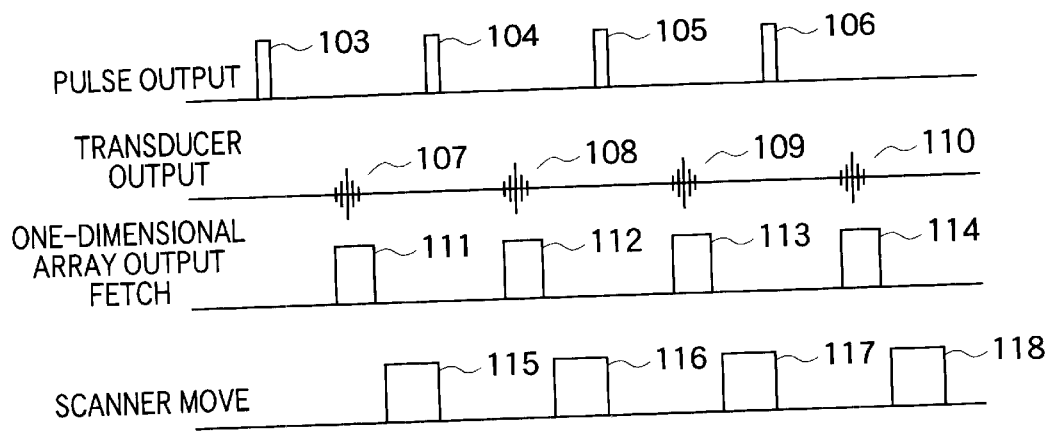
FIG. 10 is a timing chart representing the timing of operation of the ultrasonic detection apparatus of FIG. 9.

Reference is then made to FIGS. 9 and 10 to describe an ultrasonic detection apparatus according to a sixth embodiment of the present invention.

FIG. 9 is a system view diagrammatically showing the general configuration of the ultrasonic detection apparatus according to the sixth embodiment of the present invention. Referring to FIG. 9, ultrasonic-optical transducers 92 are disposed in a one-dimensional array. This ultrasonic detection apparatus comprises a multiplicity of (e.g., 128) laser light beam sources 91, transducers 92, PDs 95 and differential amplifiers 96 which are arranged in parallel to make independent and parallel measurements.

The array including the plurality of transducers 92 is scanned by means of a drive unit 93 in the direction of arrow 102 in the diagram. This scanning makes a two-dimensional measurement of a region 94 to be measured. An ultrasonic wave transmission unit 98 sends ultrasonic waves to the region 94 to be measured. The ultrasonic wave transmission unit 98 is activated by a drive circuit 99 which is controlled by a controller 100.

Light signals from the plurality of transducers 92 are converted into electric signals by the plurality of PDs 95 and thereafter differentially amplified by the plurality of differential amplifiers 96 for the feed to a data fetch circuit 97. Date fetched by the data fetch circuit 97 is sent to the controller 100 for imaging processing and displayed on a CRT 101 (display unit).

Operation of the ultrasonic detection apparatus will herein be described.

FIG. 10 is a timing chart representing the operation timing of the ultrasonic detection apparatus as shown in FIG. 9. FIG. 10 depicts at its topmost rank ultrasonic pulses issued from an ultrasonic wave transmission unit 98. Transmitted in this example are four ultrasonic pulses designated by 103, 104, 105 and 106. The pulses are output at equal intervals.

The second rank of FIG. 10 shows detection signals output from the transducers 92. With delay of predetermined time after the ultrasonic pulse is output from the ultrasonic wave transmission unit 98, the PDs 95 detects four light signals designated by 107, 108, 109 and 110.

The third rank of FIG. 10 shows the timing to fetch detection signals output from the PDs 95. In response to the light signal output from the transducers 92, four detection signals are fetched into the fetch circuit 97 as indicated by 111, 112, 113 and 114. The fourth rank shows the operation timing of the drive unit 93 for driving the array of the transducers 92. For each termination of fetch of the detection signals from the PDs 95, the drive unit 93 moves the array of the transducers 92 by a predetermined distance in the direction of array 102 at four timings 115, 116, 117 and 118. After the completion of movement, the ultrasonic wave transmission unit 98 issues next pulses.

This ultrasonic detection apparatus is characterized in that the ultrasonic-optical transducers are disposed in a one-dimensional array such that the one-dimensional array is mechanically scanned to measure the two-dimensional distribution of ultrasonic waves. It is typically difficult to two-dimensionally arrange the triangular prisms to allow external light to impinge on the triangular prisms, due to the fact that beams of light may overlap on the triangular prisms adjoining along the direction of incidence of the light. As discussed earlier, it is difficult for the plane one-shot exposure type transducer to secure an even gap length, which may result in dispersion in sensitivity between the plurality of light receiving devices. On the contrary, the one-dimensional arrangement of the plurality of triangular prisms with the other axis direction being mechanically scanned would obviate the disadvantage which may occur when the triangular prisms are arranged two-dimensionally. Use of separate light receiving devices makes it possible to adjust the dispersion in sensitivity between the light receiving devices attributable to the uneven gap length, which has been problematic for the plane one-shot exposure.

Figure 11:
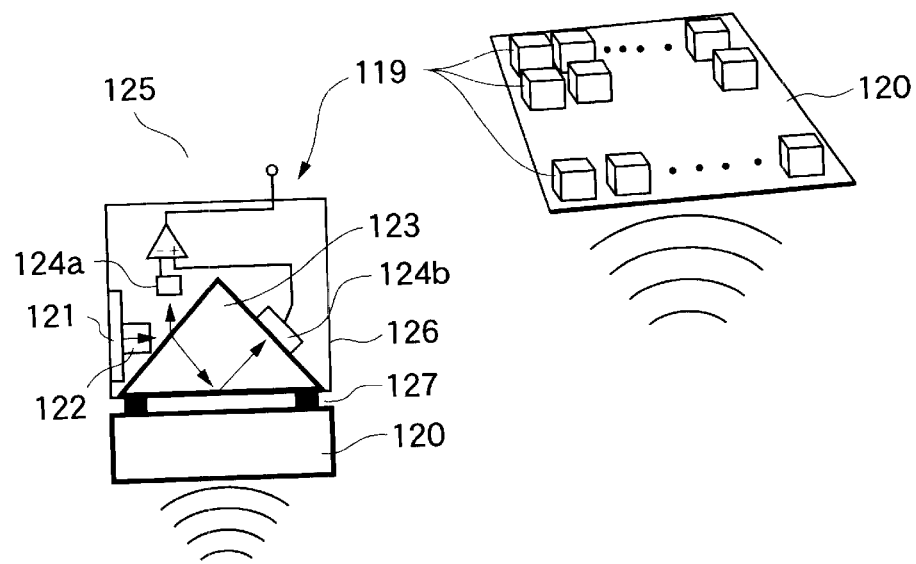
FIG. 11 is a diagrammatic view showing the general configuration and an enlarged portion of an ultrasonic detection apparatus according to a seventh embodiment of the present invention.

Description will then be made of an ultrasonic detection apparatus according to a seventh embodiment of the present invention. FIG. 11 diagrammatically shows the general configuration and an enlarged portion of the ultrasonic detection apparatus according to this embodiment.

As seen in FIG. 11, a plurality of ultrasonic-optical transducer units 119 are two-dimensionally arranged on an optical flat 120 so as to form two-dimensional array sensor pixels. Each ultrasonic-optical transducer unit 119 comprises a single casing 126 which encloses a light source 121, a micro-lens 122, a triangular prism 123, a pair of light receiving devices 124a and 124b, and a differential amplifier 125. The casing 126 is disposed on the optical flat 120 by way of spacers 127. Ultrasonic waves are radiated from below the optical flat 120.

The triangular prism 123 is arranged such that its main surface confronts the optical flat 120. Light emitted from the light source 121 passes through the micro-lens 122 to result in a light beam to be used to detect ultrasonic waves. The light beam strikes on the left-hand inclined surface of the triangular prism 123 such that the incident light is partly reflected therefrom and received by the light receiving element 124a. The remainder of the incident light is refracted at the left-hand inclined surface and totally reflected from the main surface. The totally reflected light is again refracted at the right-hand inclined surface of the triangular prism 123 to exit the triangular prism 123 for receipt by the light receiving device 124b. The light received by the light receiving devices 124a and 124b is differentially amplified by the differential amplifier 125 and then sent to the data fetch circuit which follows the differential amplifier 125.

According to this embodiment, the unit including the light source, the triangular prism, the light receiving devices, etc., detects ultrasonic waves from a region corresponding to one pixel, with the result that unlike the introduction of the light from the exterior as in the sixth embodiment, the ultrasonic-optical transducers can be arranged two-dimensionally with less dispersion in sensitivity between the light receiving devices.

The ultrasonic wave detection apparatus or method according to the present invention is equally applicable to a sensor for detecting other pressure than the ultrasonic waves.

Figure 12:
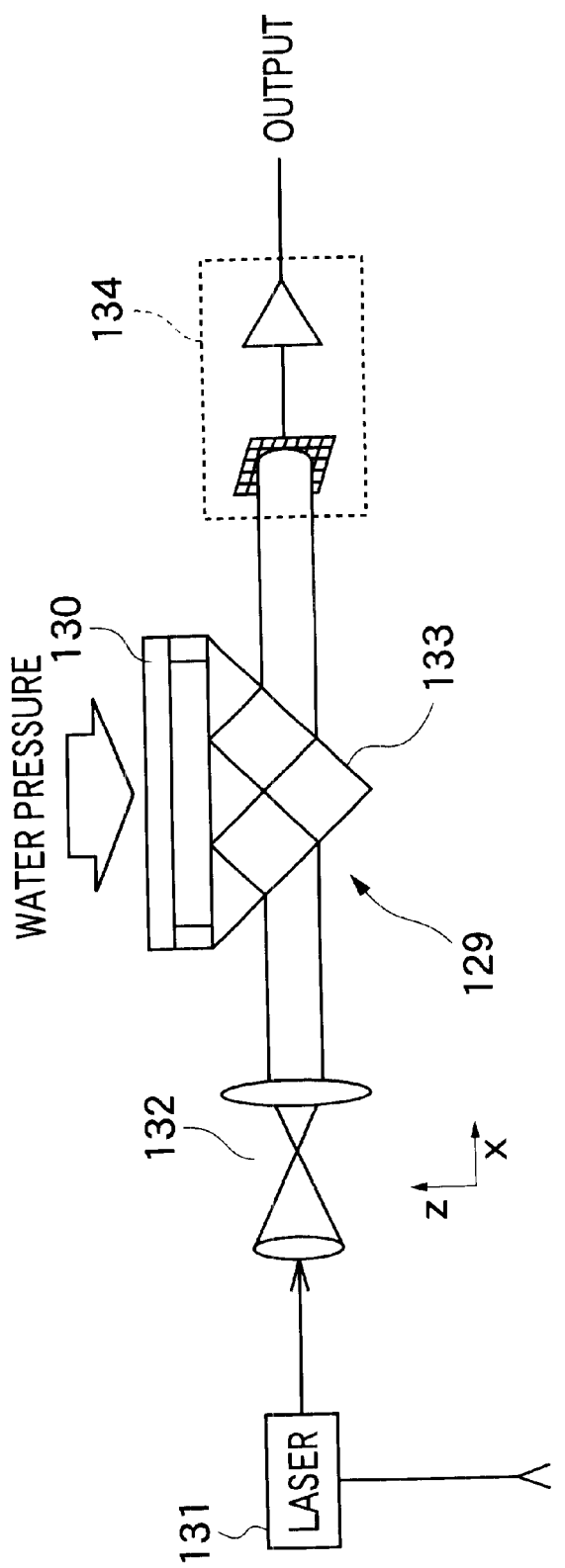
FIG. 12 is a diagrammatic view showing the general configuration of a water pressure sensor for measuring a water pressure by using an ultrasonic detection method of the present invention.

FIG. 12 is a system view diagrammatically showing a part of the configuration of a water pressure sensor for measuring the water pressure by using the ultrasonic wave detection apparatus or method according to the present invention.

This water pressure sensor is configured such that a water pressure is applied onto an optical flat 130 of a transducer 129. A pulsed laser light beam emitted from a laser light beam source 131 passes through a beam expander 132 to result in a light beam to be used to detect water pressure. The light beam falls on and is refracted at the left-hand inclined surface of a triangular prism 133. The light is totally reflected from the main surface and again refracted at the right-hand inclined surface to leave the triangular prism 133. The light reflected from the main surface is received by a CCD imaging device 134 for output to a data fetch circuit not shown which follows the CCD imaging device 134. The other features of this water pressure sensor are substantially the same as those of FIG. 1

Figure 13:
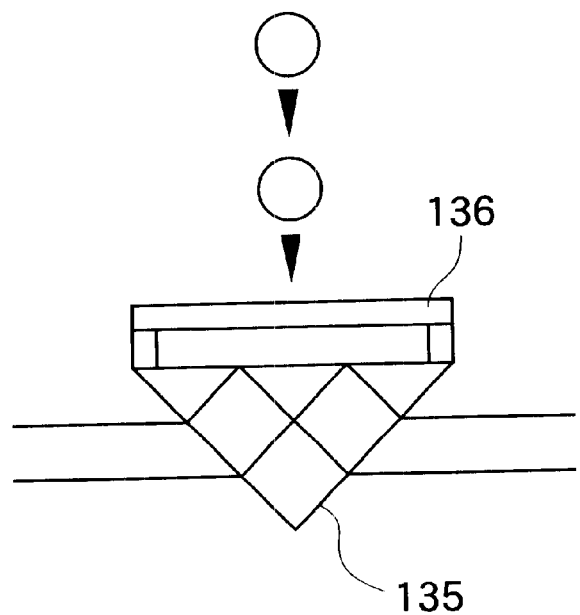
FIG. 13 is a diagrammatic view showing the general configuration of an impulse sensor for measuring an impulse by using the ultrasonic detection method of the present invention.

FIG. 13 diagrammatically shows a part of the configuration of an impulse sensor for measuring an impulse by using the ultrasonic wave detection apparatus or method according to the present invention.

This impulse sensor is configured such that the impulse is applied on an optical flat 136 of a transducer 135. The other features of this impulse sensor are substantially the same as those of FIG. 1.

The ultrasonic detection apparatus hereinabove described could variously be modified.

Figure 14:
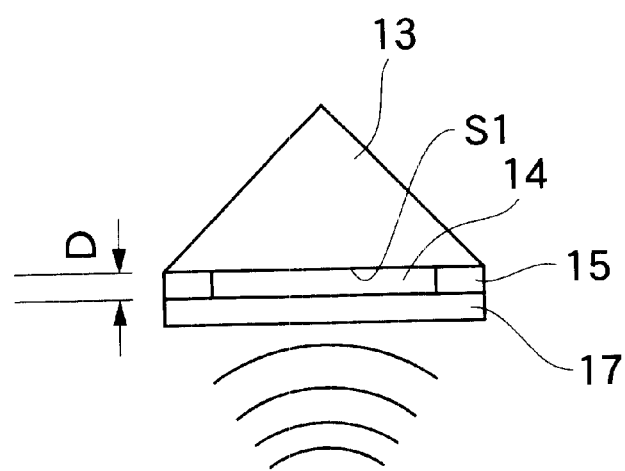
FIG. 14 is a diagrammatic view showing, in an enlarged scale, a part of a modified ultrasonic detection apparatus which is a modification of the first embodiment.

FIG. 14 exemplarily depicts a modified ultrasonic-optical transducer included in the ultrasonic detection apparatus shown in FIG. 1.

The ultrasonic-optical transducer as shown in FIG. 14 can have a variable length of the gap 14 defined between the triangular prism 13 and the optical flat 17. More specifically, the length of the gap 14 can be varied by altering the thickness of the spacers 15 interposed between the main surface S1 of the triangular prism 13 and the optical flat 17. The thickness of the spacers 15 can be altered for example by disposing as the spacers a micro-motion stage formed by using a piezoelectric device such as a PZT and changing the voltage applied on the piezoelectric device.

The length of the gap 14 between the triangular prism 13 and the optical flat 17 influences the intensity of the near-field light leaking into the optical flat 17, in other words, it influences the detection sensitivity of the ultrasonic echoes. For instance, accordingly as the elapsed time from the pulse oscillation becomes longer, i.e., the depth of the echo source increases, the ultrasonic wave damps to a larger extent. For this reason, the length of the gap 14 is reduced with the lapse of time to enhance the detection sensitivity such that the detection sensitivity can conform to the intensity of the incident ultrasonic echoes.

Figure 15A:
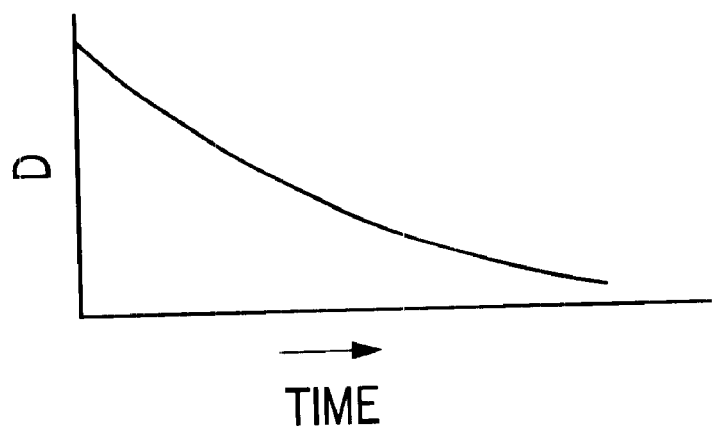
FIG. 15A is a graphical representation showing the relationship between the elapsed time from the pulse oscillation and the gap length.
Figure 15B:
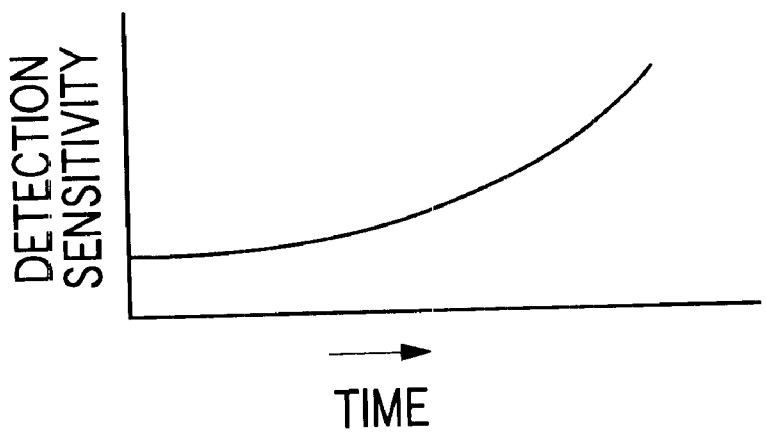
FIG. 15B is a graphical representation showing the relationship between the elapsed time from the pulse oscillation and the detection sensitivity of ultrasonic reflection echoes.

Referring then FIGS. 15A and 15B, such a function will be described in larger detail. FIG. 15A is a graphic representation showing the relationship between the elapsed time from the pulse oscillation and the gap length, and FIG. 15B is a graphic representation showing the relationship between the elapsed time from the pulse oscillation and the detection sensitivity of ultrasonic reflection echoes. In FIGS. 15A and 15B, the axis of abscissas represents the elapsed time from the oscillation, with the axis of ordinates of FIG. 15A representative of the gap length, the axis of ordinates of FIG. 15B representative of the detection sensitivity.

When the elapsed time is short, i.e., the source of echo is shallow, the gap length is increased as shown in FIG. 15A to lower the detection sensitivity as shown in FIG. 15B. In contrast, when the elapsed time is long, i.e., the source of echo is deep, the gap length is decreased as shown in FIG. 15A to heighten the detection sensitivity as shown in FIG. 15B. This is the same as the function to change the gain of the amplifier in dependence on the elapsed time (the depth of the echo source), i.e., the function called as "TGC (time gain compensation)" or "STC (sensitivity time control)" in the existing ultrasonic image diagnostic.

Figure 16:
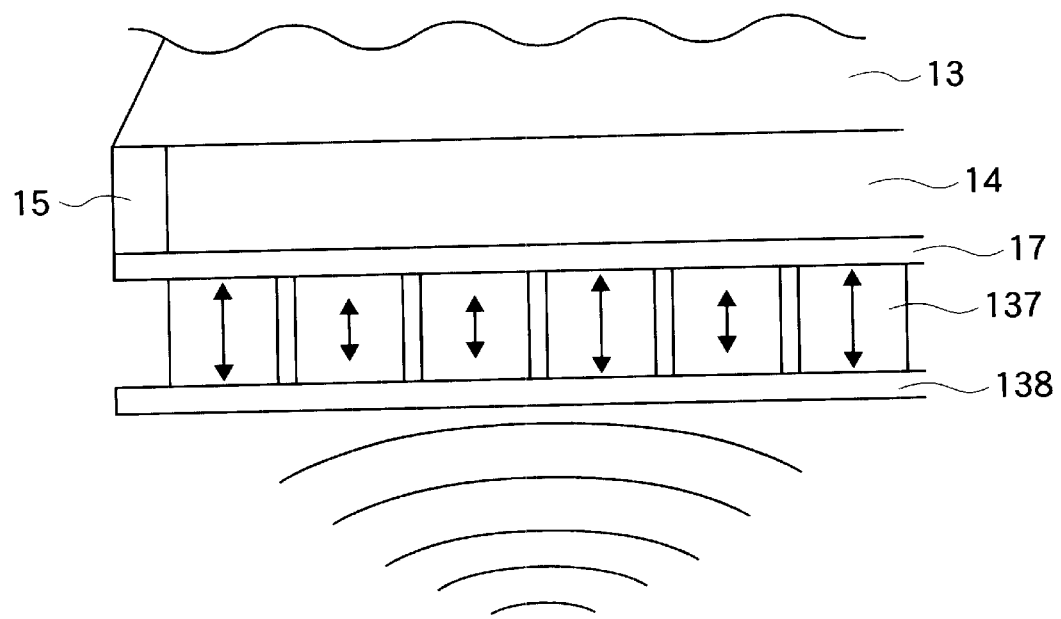
FIG. 16 is a diagrammatic view showing, in an enlarged scale, a part of a modified ultrasonic detection apparatus which is another modification of the first embodiment.
Figure 18A:
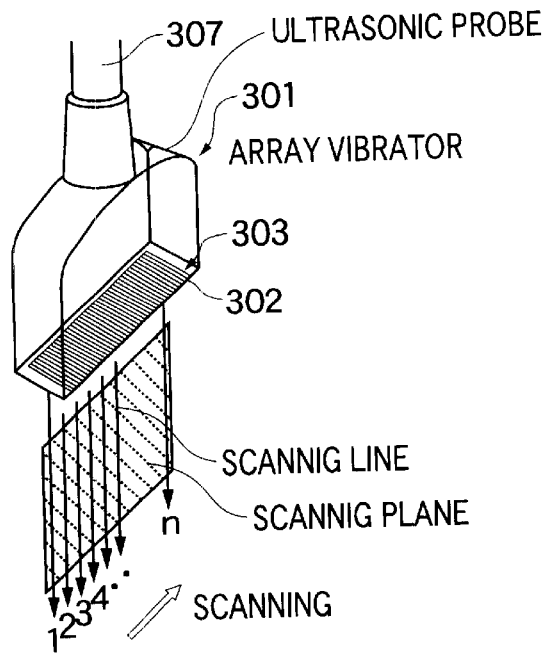
FIG. 18A is a representation diagrammatically showing the structure of a conventional probe.
Figure 18B:
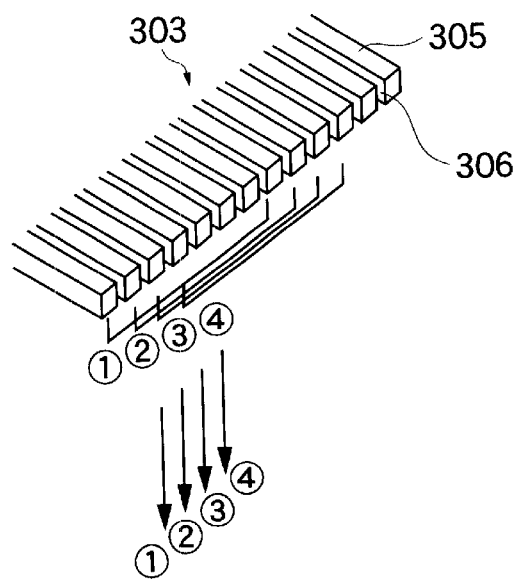
FIG. 18B is an enlarged view of a part of the probe of FIG. 18A.

FIG. 16 depicts another example of the modified ultrasonic-optical transducer included in the ultrasonic detection apparatus shown in FIG. 1.

This ultrasonic-optical transducer has a mechanism for correcting local unevenness. The optical flat 17 has, on its surface confronting the object, a fixed plate 138 provided by way of a PZT array 137 including two-dimensionally arranged PZTs. Voltage applied to each PZT is separately controlled to alter the thickness of the PZT such that the optical flat 17 can be free from unevenness. The fixed plate 138 is made of a material closer in acoustic impedance to the PZT, e.g., a material such as PZT which has not undergone polarization processing.

The correction of local unevenness can also be effected by setting the surface flatness of the triangular prism 13 and the surface flat 17 to $\lambda/10$.

Reference is then made to FIG. 17 to describe an ultrasonic diagnostic apparatus according to an embodiment of the present invention. FIG. 17 is a block diagram showing the general configuration of the ultrasonic diagnostic apparatus according to the embodiment.

The ultrasonic diagnosing apparatus comprises a drive unit 201, a probe 209, a signal processing unit 211, a television scanning conversion unit 213 and a display unit (television monitor) 215.

The drive unit 201 issues a pulsed ultrasonic drive signal to a transducer 203 for transmission of ultrasonic waves including PZT, PVDF or the like. The transducer 203 sends ultrasonic waves toward the interior of an object 206 to be inspected. A semi-transparent mirror 205 (e.g., a resin plate) for ultrasonic waves is disposed below the transducer 203. Ultrasonic echoes 207 are reflected at the object 206 upward in FIG. 17. The ultrasonic echoes 207 are then reflected rightward by the semi-transparent mirror 205 for ultrasonic waves within the probe 209 to reach a two-dimensional array ultrasonic detection unit 208.

The ultrasonic detection unit 208 converts the received ultrasonic signal into a light signal to output it to the signal processing unit 211. The signal processing unit 211 converts the light signal output from the detection unit 208 into an electric signal. The television scanning conversion unit 213 amplifies the signal output from the signal processing unit 211 and, after execution of required processing, performs imaging processing. The imaging processed signal is sent to the display unit (television monitor) 215 for image display.

Although the specific examples of the present invention have been described above in light of the drawings, the present invention is not intended to be limited to the above embodiments but various modifications and additions thereto would be feasible.

According to the present invention, as set forth hereinabove, there can be provided the ultrasonic detection apparatus and method and ultrasonic diagnostic apparatus which are capable of collecting three-dimensional ultrasonic data in real time.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. An ultrasonic detection method comprising the steps of:
   (a) introducing a light beam into an ultrasonic-optical transducer including a first optical layer and a second optical layer which define a gap having a predetermined length therebetween from a side of said first optical layer such that the light beam is totally reflected at an interface between said first optical layer and said gap to obtain the reflected light beam, said introduced light beam having a wavelength larger than the predetermined length of said gap;
   (b) applying ultrasonic waves onto said ultrasonic-optical transducer from a side of said second optical layer such that said second optical layer resiliently deforms to thereby vary intensity of light leaking from said first optical layer via said gap into said second optical layer;
   (c) two-dimensionally detecting distribution of intensity of the reflected light beam which varies depending on variation of the intensity of the light leaking from said first optical layer via said gap into said second optical layer; and
   (d) two-dimensionally obtaining distribution of sound pressure of the ultrasonic waves applied on said second optical layer on the basis of the distribution of intensity of the reflected light beam detected at step (c).

2. An ultrasonic detection method according to claim 1, wherein:
   step (c) includes two-dimensionally detecting distribution of intensity of the reflected light beam by using an area sensor.

3. An ultrasonic detection method according to claim 2, wherein:

step (d) includes reading, in parallel, the distribution of intensity of the reflected light beam detected by said area sensor.

4. An ultrasonic detection method according to claim 2, wherein:
   step (d) includes reading, in time-sharing, the distribution of intensity of the reflected light beam detected by said area sensor.

5. An ultrasonic detection method according to claim 1, wherein:
   step (d) includes subtracting the intensity of the reflected light beam detected at step (c) from the intensity of the light beam introduced into said ultrasonic-optical transducer, to thereby obtain the distribution of sound pressure of ultrasonic waves applied on said second optical layer.

6. An ultrasonic detection method according to claim 1, further comprising a step of:
   adjusting unevenness of the interface between said gap and said second optical layer.

7. An ultrasonic detection method according to claim 1, further comprising a step of:
   (e) varying the length of said gap as a function of the intensity of sound pressure of the ultrasonic waves.

8. An ultrasonic detection method according to claim 7, wherein:
   said ultrasonic waves include ultrasonic echoes reflected by an echo source within an object; and
   step (e) includes reducing the length of said gap as a function of a depth of the echo source within the object.

9. An ultrasonic detection method according to claim 1, wherein:
   step (a) includes introducing a light beam having form of a P-polarized wave into said ultrasonic-optical transducer.

10. An ultrasonic detection method comprising the steps of:
    (a) introducing a plurality of light beams into a plurality of ultrasonic-optical transducers each including a first optical layer and a second optical layer which define a gap having a predetermined length therebetween from a side of said first optical layer such that the plurality of light beams are totally reflected at respective interfaces between said first optical layer and said gap to obtain a plurality of reflected light beams, each of said introduced plurality of light beams having a wavelength larger than said predetermined length of said gap;
    (b) applying ultrasonic waves onto said plurality of ultrasonic-optical transducers from a side of said second optical layer such that said second optical layer of each ultrasonic-optical transducer resiliently deforms to thereby vary intensity of light leaking from said first optical layer via said gap into said second optical layer;
    (c) individually detecting intensity of the plurality of reflected light beams each varies depending on variation of the intensity of the light leaking from said first optical layer via said gap into said second optical layer; and
    (d) two-dimensionally obtaining distribution of sound pressure of the ultrasonic waves applied on said second optical layer on the basis of the distribution of intensity of the reflected light beams detected at step (c).

11. An ultrasonic detection apparatus comprising:
    an ultrasonic-optical transducer including a first optical layer and a second optical layer which define a gap having a predetermined length therebetween, said second optical layer being resiliently deformed such that the length of said gap varies when ultrasonic waves are applied from a side of said second optical layer;

means for introducing a light beam having a wavelength larger than the predetermined length of said gap into said ultrasonic-optical transducer from a side of said first optical layer such that the light beam is totally reflected at an interface between said first optical layer and said gap;

detecting means for two-dimensionally detecting distribution of intensity of the reflected light beam which varies depending on variation of intensity of light leaking from said first optical layer via said gap into said second optical layer; and signal processing means for two-dimensionally obtaining distribution of sound pressure of the ultrasonic waves applied on said second optical layer on the basis of the distribution of intensity of the reflected light beam detected by said detecting means.

12. An ultrasonic detection apparatus according to claim 11, wherein:

said detecting means includes an area sensor for two-dimensionally detecting the distribution of intensity of the reflected light beam.

13. An ultrasonic detection apparatus according to claim 12, wherein:

said signal processing means reads, in parallel, the distribution of intensity of the reflected light beam detected by said area sensor.

14. An ultrasonic detection apparatus according to claim 12, wherein:

said signal processing means reads, in time-sharing, the distribution of intensity of the reflected light beam detected by said area sensor.

15. An ultrasonic detection apparatus according to claim 11, wherein:

said signal processing means subtracts the intensity of the reflected light beam detected by said detecting means from the intensity of the light beam introduced into said ultrasonic-optical transducer, to thereby determine the distribution of sound pressure of ultrasonic waves applied on said second optical layer.

16. An ultrasonic detection apparatus according to claim 11, further comprising:

means for adjusting unevenness of the interface between said gap and said second optical layer.

17. An ultrasonic detection apparatus according to claim 11, further comprising:

adjustment means for varying the length of said gap as a function of the intensity of sound pressure of the ultrasonic waves.

18. An ultrasonic detection apparatus according to claim 17, wherein:

said ultrasonic waves include ultrasonic echoes reflected by an echo source within an object; and said adjustment means varies the length of said gap as a function of a depth of the echo source within the object.

19. An ultrasonic detection apparatus according to claim 11, wherein:

said light beam introduced into said ultrasonic-optical transducer includes a P-polarized wave.

20. An ultrasonic detection apparatus comprising:

a plurality of ultrasonic-optical transducers each including a first optical layer and a second optical layer which define a gap having a predetermined length therebetween, said second optical layer of each ultrasonic-optical transducer being resiliently deformed such that the length of said gap varies when ultrasonic waves are applied from a side of said second optical layer;

a plurality of means each for introducing a light beam having a wavelength larger than the predetermined length of said gap into respective one of said plurality of ultrasonic-optical transducers from a side of said first optical layer such that each light beam is totally reflected at an interface between said first optical layer and said gap;

a plurality of detecting means for detecting distribution of intensity of the reflected light beams each varies depending on variation of intensity of light leaking from said first optical layer via said gap into said second optical layer; and signal processing means for two-dimensionally obtaining distribution of sound pressure of the ultrasonic waves applied on said second optical layer on the basis of the distribution of intensity of the reflected light beams detected by said plurality of detecting means.

21. An ultrasonic diagnostic apparatus comprising:

a transmission unit for transmitting ultrasonic waves to an object;

a detection unit having:

an ultrasonic-optical transducer including a first optical layer and a second optical layer which define a gap having a predetermined length therebetween, said second optical layer being resiliently deformed such that the length of said gap varies when ultrasonic waves are applied from a side of said second optical layer;

means for introducing a light beam having a wavelength larger than the predetermined length of said gap into said ultrasonic-optical transducer from a side of said first optical layer such that the light beam is totally reflected at an interface between said first optical layer and said gap; and detecting means for two-dimensionally detecting distribution of intensity of the reflected light beam which varies depending on variation of intensity of light leaking from said first optical layer via said gap into said second optical layer;

a signal processing unit for two-dimensionally obtaining distribution of sound pressure of the ultrasonic waves applied on said second optical layer on the basis of the distribution of intensity of the reflected light beam detected by said detecting means; and a display unit for displaying an image on the basis of a detection signal output from said signal processing unit.

* * * * *